United States Patent
Handgen et al.

(10) Patent No.: US 7,343,440 B2
(45) Date of Patent: *Mar. 11, 2008

(54) INTEGRATED CIRCUIT WITH A SCALABLE HIGH-BANDWIDTH ARCHITECTURE

(75) Inventors: Erin Antony Handgen, Fort Collins, CO (US); Eri M. Rentschler, Fort Collins, CO (US); Michael Kennard Tayler, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 635 days.

This patent is subject to a terminal disclaimer.

(21) Appl. No.: 10/630,260

(22) Filed: Jul. 30, 2003

(65) Prior Publication Data

US 2005/0080958 A1    Apr. 14, 2005

(51) Int. Cl.
*G06F 13/14* (2006.01)
(52) U.S. Cl. ..................... 710/305; 710/316
(58) Field of Classification Search ............... 710/100, 710/110, 305, 306, 307, 308, 313, 316
See application file for complete search history.

(56) References Cited

U.S. PATENT DOCUMENTS 5,862,359 A * 1/1999 Nozuyama ............ 710/316
6,172,906 B1 * 1/2001 Estakhri et al. ......... 365/185.11
6,182,178 B1 * 1/2001 Kelley et al. ............... 710/314
6,502,167 B1   12/2002 Tanaka et al.
2005/0014397 A1 * 1/2005 Brown ........................ 439/68

OTHER PUBLICATIONS

Definition of "Flash Memory" from Wikipedia.*
Definition of "Flash Memory" from Wikipedia, unknown date.*

* cited by examiner

*Primary Examiner*—Khanh Dang

(57) ABSTRACT

An integrated circuit component is provided comprising logic capable of being configured to interface with a first companion integrated circuit and to receive information that is communicated from the first companion integrated circuit, which information was communicated to the first companion integrated circuit via a first portion of a system bus. The integrated circuit component further comprises logic capable of being configured to interface with a second companion integrated circuit and to receive information that is communicated from the second companion integrated circuit, which information was communicated to the second companion integrated circuit via a second portion of the system bus

2 Claims, 7 Drawing Sheets

INTEGRATED CIRCUIT WITH A SCALABLE HIGH-BANDWIDTH ARCHITECTURE

BACKGROUND OF THE INVENTION

A variety of systems are known in which a first integrated circuit component (a/k/a chip) communicates with a second or remote integrated circuit component across a bus or other communication channel.

For a variety of reasons, depending upon the system design, it often occurs that the bus bandwidth is too much for one of the integrated circuit components. Also, the pin count of one of the integrated circuit components often is so large that it excessively drives up the manufacturing cost of the chip. In this regard, there is a recognized exponential (as opposed to linear) component to production costs for integrated circuit components in relation to pin count.

As one example, consider a system having a host processor communicating to a plurality of memory chips through a memory controller. As the number of memory chips increases, the pin count of the memory controller chip also increases. This leads to excessive manufacturing costs of the memory controller chip, which is undesirable. Likewise, the bandwidth of the system bus (between the host processor and memory controller) may exceed that supportable by the memory controller.

SUMMARY OF THE INVENTION

Accordingly, it is desired to provide a system that effectively addresses the bandwidth demands, manufacturing costs, and other shortcomings of prior art computing systems.

The present invention is broadly directed to an integrated circuit component with a scalable architecture. In one embodiment, an integrated circuit component is provided comprising logic capable of being configured to interface with a first companion integrated circuit and to receive information that is communicated from the first companion integrated circuit, which information was communicated to the first companion integrated circuit via a first portion of a system bus. The integrated circuit component further comprises logic capable of being configured to interface with a second companion integrated circuit and to receive information that is communicated from the second companion integrated circuit, which information was communicated to the second companion integrated circuit via a second portion of the system bus.

DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE PREFERRED EMBODIMENT

Figure 1:
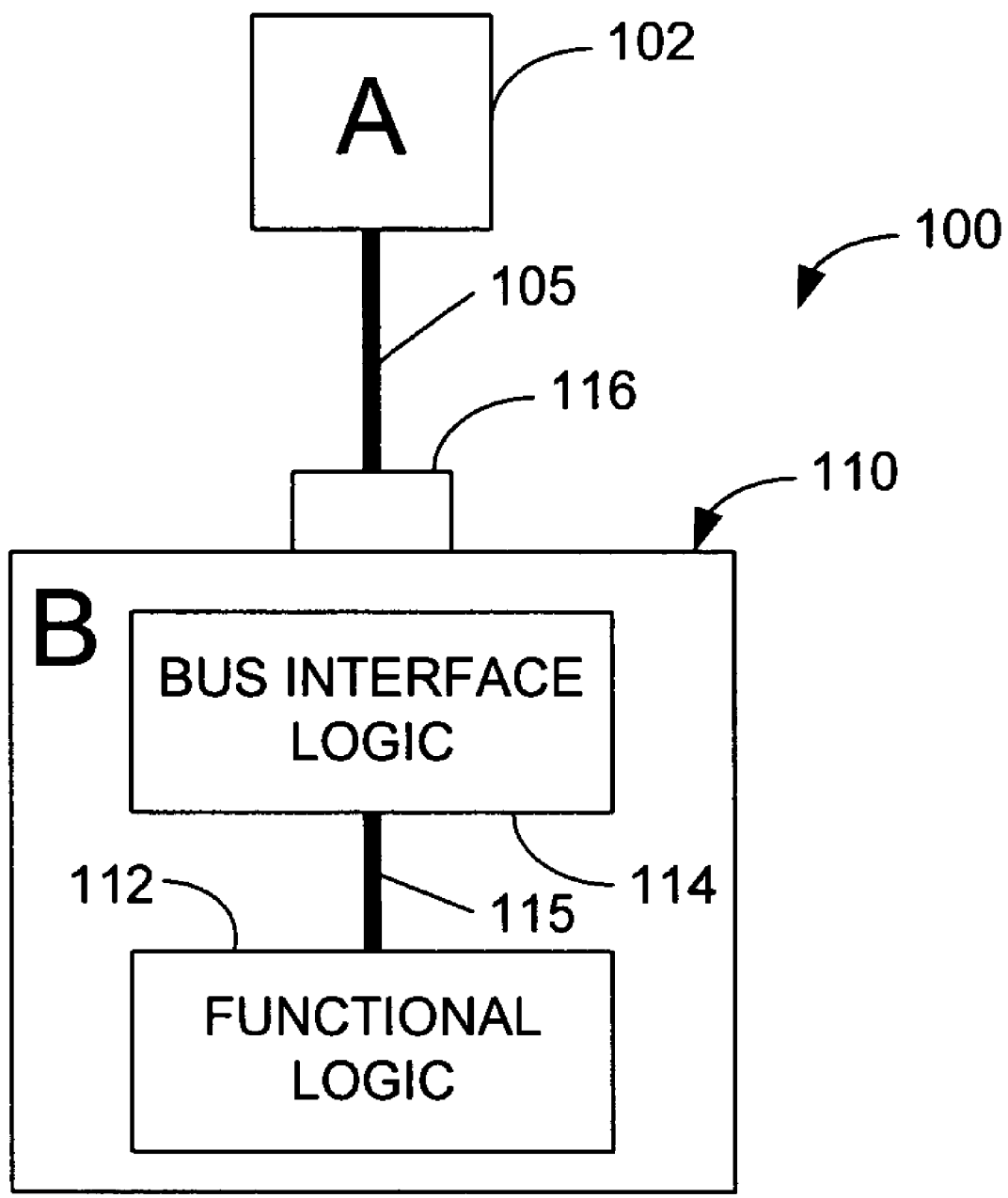
FIG. 1 is a block diagram illustrating a conventional system in which two integrated circuit components intercommunicate across a bus.

Reference is now made to FIG. 1, which is a block diagram illustrating a conventional system 100, in which two integrated circuit components 102 and 110 intercommunicate across a bus 105. As will be appreciated from the description provided herein, the integrated circuit components 102 and 110 may be any of a wide variety that are suitable for a wide variety of applications. As the present invention is not limited to any particular application or functionality, the integrated circuit components 102 and 110 are illustrated generically herein. In this regard, integrated circuit component 110 may include functional logic 112 as well as interface logic 114. The functional logic 112 implements the particular function of the integrated circuit, while the interface logic 114 is for communicating with the remote integrated circuit component 102. An internal bus 115 or other communication path may be provided for communications between the functional logic 112 and bus interface logic 114. The functional logic 112, as the name implies, is the logic that is unique to the integrated circuit component 110 for carrying out the function of that device. For example, if the integrated circuit 110 is a memory controller, then the functional logic 112 may include the logic circuitry for carrying out the function of the memory controller. Likewise, if the integrated circuit 110 is a cache, then the functional logic 112 may include the memory, addressing, and control circuitry necessary for carrying out the cache functionality.

Conductive pins (denoted by a single block in FIG. 1) 116 are also provided in connection with the integrated circuit component 110. As is known, conductive pins are conventionally used for establishing and maintaining the electrical and mechanical coupling between the integrated circuit 110 and a circuit board (or substrate for carrying the integrated circuit component). Other conductive pins (not shown in FIG. 1) may also be provided on the integrated circuit 110 for communicating with other devices (not shown in FIG. 1).

In a system such as that illustrated in FIG. 1, situations sometimes arise in which the number of pins 116 increases to an amount that imposes unduly excessive manufacturing costs on the integrated circuit component 110. In other situations or circumstances, the bandwidth across the bus 105 may exceed the bandwidth that is accommodated by the functional circuitry 112 of the integrated circuit component 110. The present invention addresses these situations.

As described herein, there are various aspects and embodiments of the present invention. Embodiments of one aspect are described with reference to FIG. 2 through FIG. 5. A second aspect is described with reference to FIGS. 6 and 7.

Figure 2:
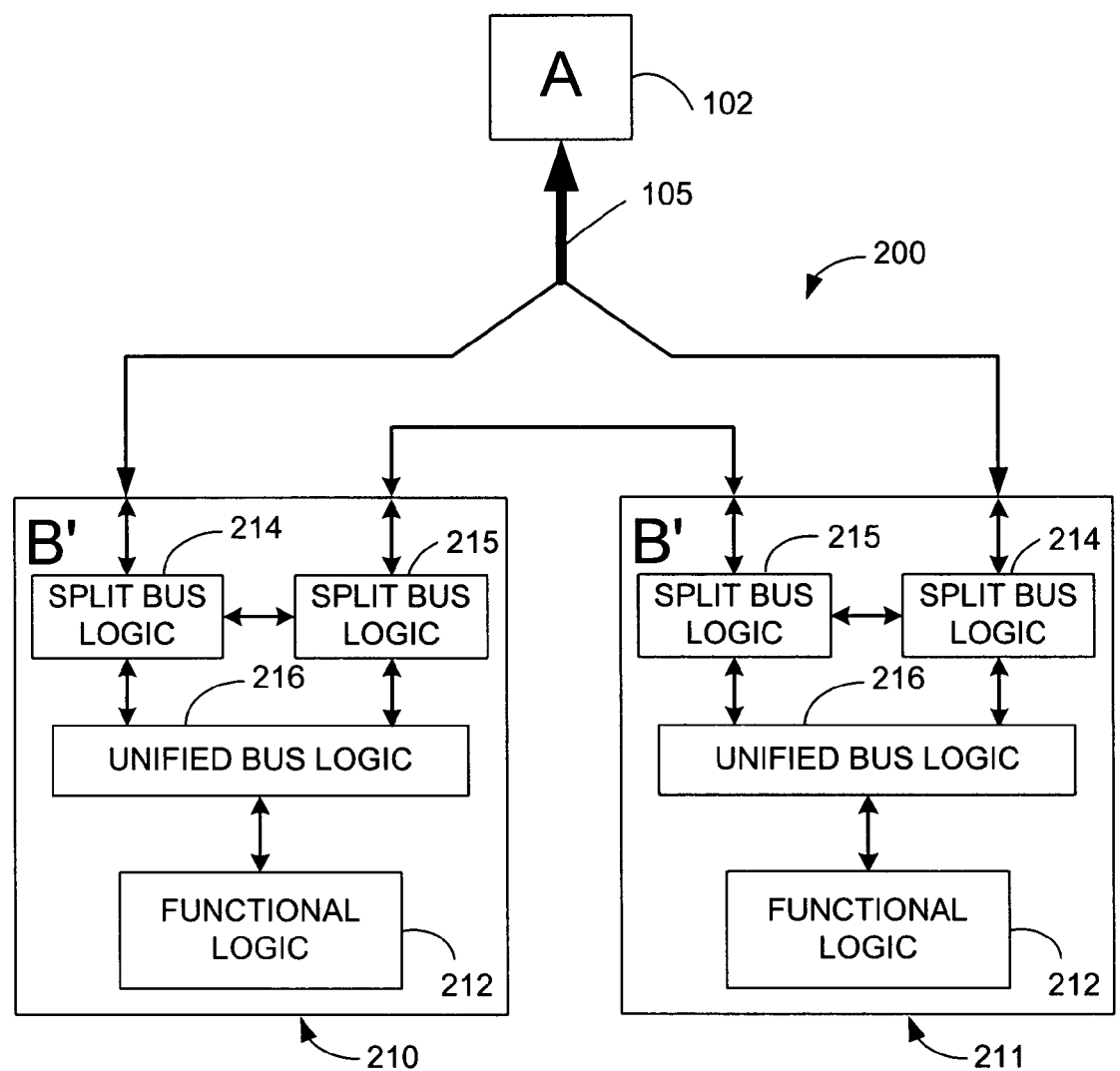
FIG. 2 is a block diagram illustrating a system constructed in accordance with one embodiment of the present invention, in which functional logic of a single, conventional integrated circuit component is split across two integrated circuit components.

Reference is now made to FIG. 2, which is a block diagram illustrating an embodiment of the present invention. As summarized above, an embodiment of the invention is directed to a system having two, companion integrated circuit components that collectively operate to emulate an integrated circuit component that is conventionally provided on a single chip. When emulating integrated circuit components, such as a memory controller, manufacturing costs generally increase with increasing pin count. While the embodiment of the invention illustrated in FIG. 2 results in additional on-chip circuitry (described below), the combination of companion components 210 and 211 that effectively emulate a single, conventional component provides other improvements over the conventional-component approach. One such benefit is the manufacturing cost reduction by virtue of a reduction in the number of conductive pins that are required for a single integrated circuit component 210. In fact, the manufacturing cost for a single component 210 may be more than cut in half, making the use of two such components (as in FIG. 2) to emulate a single device more cost effective than using a single, conventional device. Another such benefit may be realized through bandwidth enhancements or the accommodation of greater bandwidth through the combined functional circuitry of the components 210 and 211.

The integrated circuit component 210 includes functional logic 212 that performs the functional aspects of the conventional integrated circuit component that the components 210 and 211 combine to replace. Therefore, a discussion of the functional logic 212 need not be provided herein. With regard to the inventive features of the system 200, the integrated circuit components 210 and 211 include logic blocks denoted as "split bus logic" 214 and 215 and "unified bus logic" 216.

As illustrated in FIG. 1, a conventional configuration includes integrated circuit components 102 and 110 that intercommunicate across a system bus 105. In the inventive system 200 of FIG. 2, the system bus 105 is split, so that approximately one half of the bus is directed to integrated circuit component 210, while the remaining portion of the bus 105 is directed to integrated circuit component 211. A split bus logic component 214 is provided to interface with the portion of the system bus 105 directed to that particular integrated circuit component. Both integrated circuit components 210 and 211 have blocks denoted by reference numerals 214 and 215. In one embodiment, the circuitry and logic within the split bus logic components 214 and 215 are identical. However, the logic blocks have been denoted with differing reference numerals to indicate a differing functionality, based upon the configuration of those logic blocks. For example, in the configuration illustrated in FIG. 2, the split bus logic blocks 214 are configured to interface with a portion of the system bus 105. Split bus logic blocks 215 are configured to interface with the companion logic block of the companion integrated circuit component. Thus, the split bus logic block 215 of component 210 interfaces directly with the split bus logic block 215 of component 211.

In operation, data that is received by split bus logic block 214 of component 210 is past through split bus logic 215 of component 210, and split bus logic 215 of component 211. Likewise, data received from the system bus 105 through split bus logic 214 of component 211 is passed through split bus logic 215 of component 211 and through split bus logic 215 of component 210. Through this sharing and passage of data, the entirety of the data communicated over the system bus 105 may be provided to each of the components 210 and 211. This data is consolidated by the unified bus logic component 216 of each of these two devices. Thereafter, the functional logic 212 in each of the components 210 and 211 may operate on the data as appropriate. It should be appreciated that the manner in which the functional logic 212 operates on the data will depend upon the particular embodiment and environment of the functional logic that is being implemented. A specific illustration of one embodiment is presented in connection with FIG. 5, which will be described below.

A principle benefit of the present invention is the cost reduction that is realized through reductions in manufacturing costs of the integrated circuit components 210 and 211 by virtue of pin count reduction. Although such a reduction is not necessarily evident from the illustration of FIG. 2, however, as the functional logic 212 interfaces with external integrated circuit components, the reduction in pin count can more readily be identified (see FIG. 5).

In one embodiment, not specifically illustrated, the split bus logic 214 and/or 215 may be equipped with additional logic for determining, based upon the content of the information received from the system bus 105, whether that data needs to be communicated to the companion integrated circuit component. For example, if it is determined by the split bus logic 214 of component 210 that data received from the system bus 105 is uniquely directed to the functional logic 212 of component 210, and not the functional logic 212 of component 211, then this additional logic (not shown) may determine that the received data need not be communicated to the companion component 211. It will be appreciated by persons skilled in the art that there are a variety of embodiments in which just such a determination may be identifiable, and therefore desirably implemented.

It should be further appreciated that a benefit of the integrated circuit component 210 and/or 211 of the present invention is that the system 200 may be implemented without the knowledge of component 102. That is, the two integrated circuit components 210 and 211 may be implemented in a system having the configuration illustrated in FIG. 2, in place of a conventional prior art component 110, without any configuration or other change with respect to device 102. In this regard, device 102 does not "know" whether it is dealing with a conventional component 110 or components 210 and 211 constructed in accordance with the invention.

Figure 3:
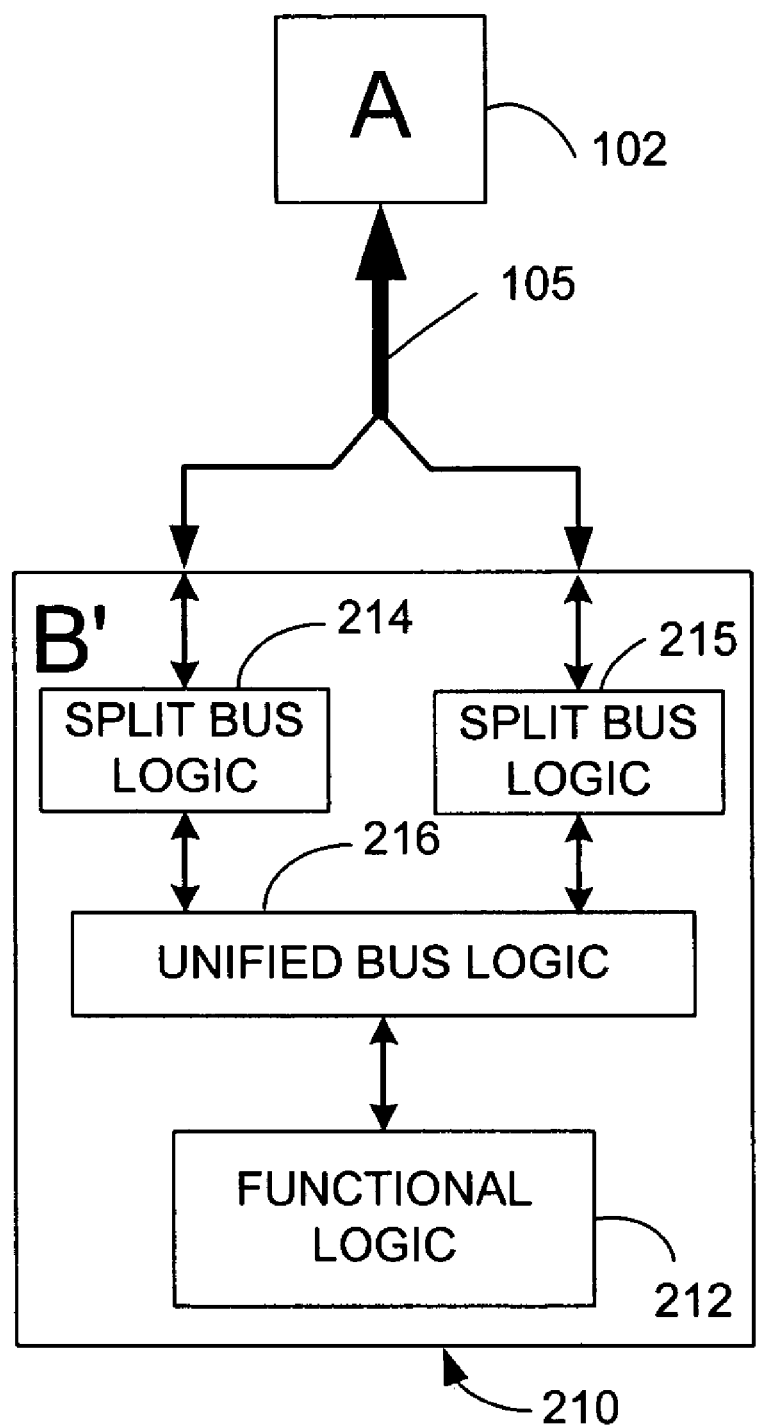
FIG. 3 is a block diagram illustrating an integrated circuit component of an embodiment of the present invention, in which a single integrated circuit component is configured to operate in a single-chip configuration to mimic an otherwise conventional integrated circuit component.

Reference is now made briefly to FIG. 3, which illustrates a component 210 constructed in accordance with the invention and configured to replace the component 110 (FIG. 1) of the prior art in a single-component configuration. In this embodiment, the component 210 contains the same internal logic elements, which include split bus logic 214 and unified bus logic 216. However, as opposed to the configuration of FIG. 2, wherein split bus logic components 215 were configured to intercommunicate data to a companion integrated circuit component, the split bus logic components 214 of the embodiment of FIG. 3 merely interface directly with the system bus 105 and communicate the data directly to the unified bus logic 216. Since only one integrated circuit component 210 is utilized in the embodiment of FIG. 3, no split bus logic component need be configured in the configuration of the split bus logic component 215 of FIG. 2.

Figure 4:
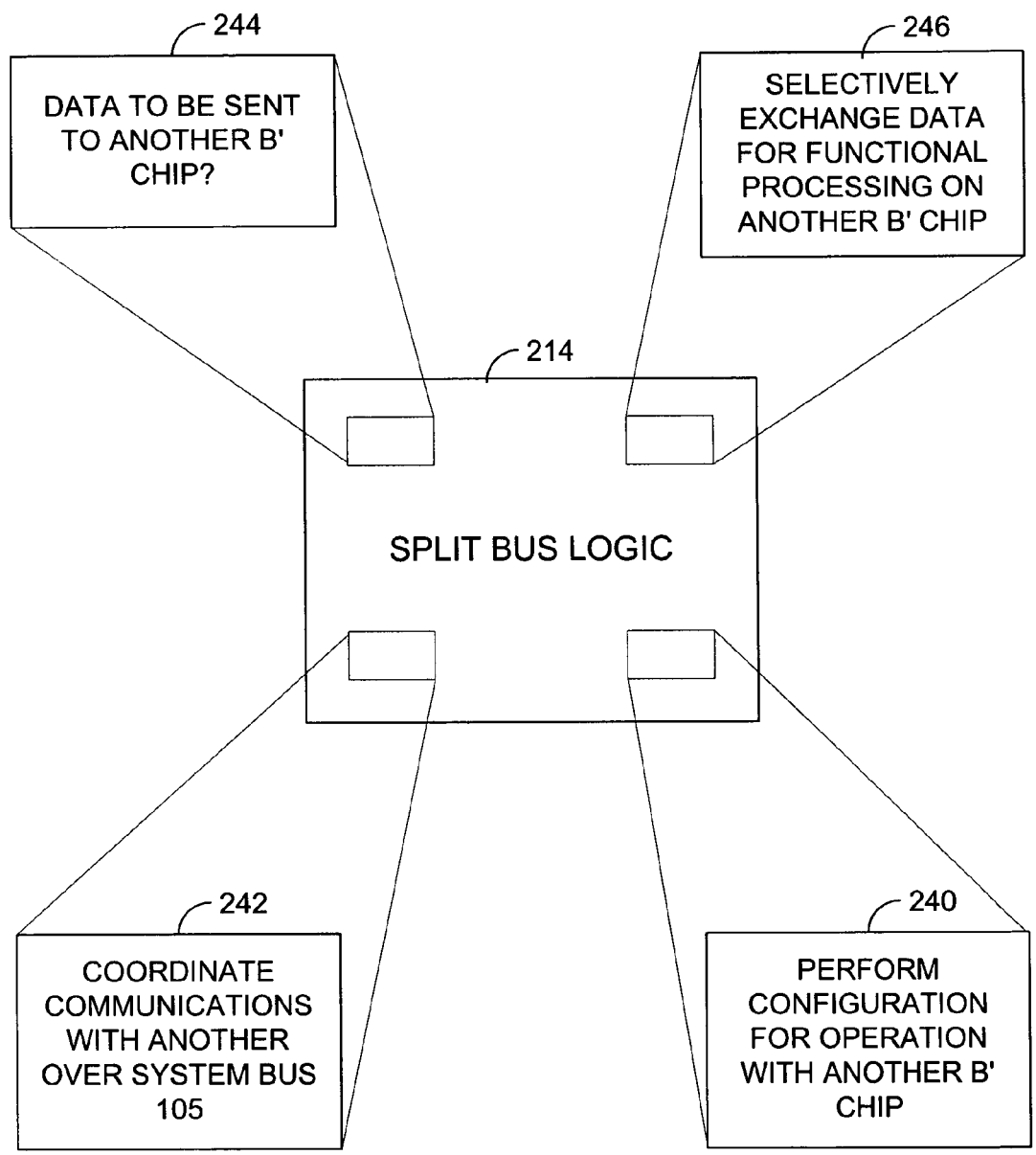
FIG. 4 is a block diagram illustrating portions of a logic interface that may be implemented in an embodiment of the present invention.

Reference is now made to FIG. 4, which illustrates certain internal logic components of a split bus logic component 214. In one embodiment, the component 214 includes internal logic 240 for performing or providing a configuration of the component 214 for operation with a companion component that is provided within a companion integrated circuit component. In essence, the logic 240 configures the split bus logic component 214 to operate in the configuration of split bus logic component 215 of FIG. 2. When in this configuration, data received from a companion split bus logic component 214 (in the same integrated circuit component) is communicated over an external bus or communication path to a companion split bus logic component in a different (companion) integrated circuit component.

Another component 242 within the split bus logic 214 coordinates and controls communications over the system bus 105. This component 242 may be implemented using known circuitry and logic for performing protocol conversions and other actions that are customary and appropriate for communicating with external devices over a specified communication bus.

Component 244 may be provided for determining whether data received from the system bus 105 is to be communicated to a companion integrated circuit component. As previously mentioned, the split bus logic may include sufficient intelligence to determine, based upon the content of the information received over the system bus 105, whether the data received over the system bus 105 is to be communicated to a companion integrated circuit component. Finally, a component 246 may be provided to selectively exchange data with a companion split bus logic component of a companion integrated circuit component for processing by the functional logic within that companion integrated circuit component. Of course, additional components may be provided within the split bus logic 214, as will be appreciated by persons skilled in the art, but need not be described herein for purposes of understanding the structure and operation of the illustrated embodiment of the present invention.

Figure 5:
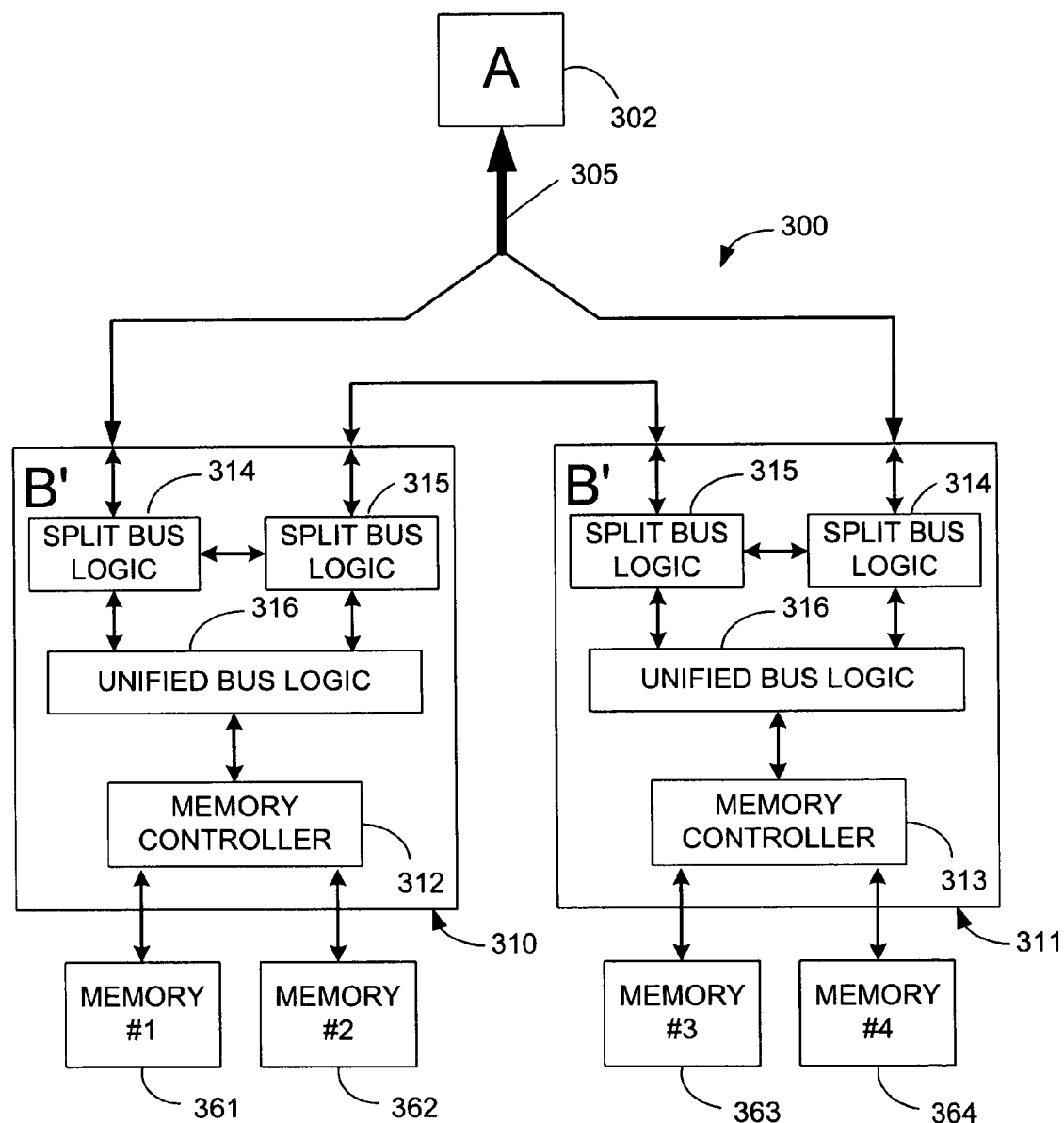
FIG. 5 is a block diagram similar to FIG. 2, illustrating an embodiment of the present invention, in which a plurality of integrated circuit components implement a memory controller component.

Finally, reference is made to FIG. 5, which is a diagram similar to FIG. 4, illustrating the implementation of components 310 and 311, constructed and configured in accordance with the present invention, to implement a memory controller device. In this regard, the system 300 includes a system bus 305 that communicates with a device, such as a host processor 302. The host processor 302 may issue commands to read and/or write to memory devices 361, 362, 363, and 364. The internal components, including the split bus logic components 314 and 315 and the unified bus logic component 316 are configured to operate in the manner described in connection with FIG. 2 herein. The functional logic 212 illustrated and described in connection with FIG. 2 is replaced by the memory controller logic 312 and 313 of FIG. 5.

By way of illustration, suppose the host process 302 wishes to read data from memory 1 361. Appropriate address and control signals are asserted on the system bus 305 to implement such a memory read command. Approximately one half of this system bus is directed to component 310 while the remaining portion of the signals of the system bus 305 are directed to component 311. Since the memory 361 to be accessed is coupled with component 310, the split bus logic components within component 310 may determine that no information received from the split bus logic 314 of component 310 needs to be communicated to the split bus logic component 315 of component 311. However, depending upon the bus configuration of system bus 305, data or information communicated to the split bus logic 314 of component 311 may be required to be communicated through the split bus logic components 315 so that the information may be unified by logic 316 for communication to the memory controller 312.

Likewise, once data is read from the memory 361 and passed through the memory controller 312 and unified bus logic 316 of component 310, part or all of the information may be communicated through split bus logic 314 of component 310, the system bus 305, to the host processor 302. Similarly, all or part of the information may be passed through split bus logic components 315 of components 310 and 311, the split bus logic 314 of component 311, the system bus 305 and onto the host processor 302. The direction and routing of information through the various subcomponents of integrated circuit components 310 and 311 will depend largely upon the structure, design, and protocol of the system bus 305. In one embodiment, the present invention is designed for operation with a point-to-point serial bus, having multiple data and control lines for communicating data and control signals between integrated circuit components. However, consistent with the concepts and teachings of the present invention, other types of system bus configurations may be supported.

As mentioned above, one benefit of one embodiment of the invention is lower manufacturing costs resulting from a reduced number of pins (per chip) for carrying out the collective operation (e.g., configurations of FIGS. 2 and 5). In such embodiments, a first set of conductive pins is provided on the component for carrying communications between the split logic bus interface 214 and the portion of the system bus 105 (e.g., communications with a remote component 102). A second set of conductive pins is provided on the component for carrying communications between the companion split logic bus interfaces 215 of companion components. Additional conductive pins may be provided for carrying other control and communication signals. Importantly, the total number of conductive pins for the integrated circuit component is fewer than a conventional integrated circuit component for performing the same functional operation.

The above paragraph illustrates how, in one embodiment, two chips may be connected on the system bus without increasing the number of system bus pins on each component, which is one advantage of this invention. With regard to FIG. 5, however, another significant reduction in pin count is realized. In this regard, a conventional memory controller component would require 4 sets of memory interconnect pins to interface the four memory busses of memories 361, 362, 363, and 364 to the system bus 305. The present invention, as shown in FIG. 5, reduces the required memory interface pins per component by half (per chip), which will result in a significant reduction in the manufacturing cost of the component.

It should be appreciated that there are a variety of ways to implement the requisite circuitry and logic for carrying out the functionality and operations described above. One such particular implementation is described and illustrated and illustrated in co-pending application Ser. No. 10/630,460, filed on the same day as the present application (and entitled "Integrated circuit with a scalable high-bandwidth architecture"), which co-pending application is incorporated herein by reference.

Having described certain embodiments that embody one aspect of the invention, reference will now be made to another aspect of the present invention. In this regard, reference is made to FIG. 6, which is a diagram similar to the diagram of FIG. 2. The diagram of FIG. 6, however, illustrates a system 400 having an additional chip 410 interposed between the chips 210 and 211. The chip 410 maybe identical in design to the chips 210 and 211. In configuration, however, split bus logic interfaces 415a and 415b are configured in the same was as split bus logic 215 of chip 210 and 211.

Specifically, the split bus logic interfaces 415a and 415b are configured to merely pass all information received from a split bus logic interface from another chip to the companion split bus logic interface (e.g., split bus logic interface 415a passes all information from split bus logic 215 of chip 210 to split bus logic interface 415b, and split bus logic interface 415b passes all information from split bus logic 215 of chip 211 to split bus logic interface 415a).

In one embodiment, the unified bus logic 416 and functional logic 412 may be inactive, and no information communicated from chips 210 and 211 is passed through the unified bus logic 416 to the functional logic 412. In an alternative, but similar embodiment, however, the split bus logic interfaces 415a and 415b may be configured to pass information through the unified bus logic 416 to the functional logic 412. In such an embodiment, the functional logic 412 of the chip 410 may share in the processing workload, to assist the functional logic 212 of chips 210 and 211 with the desired functional processing.

Figure 6:
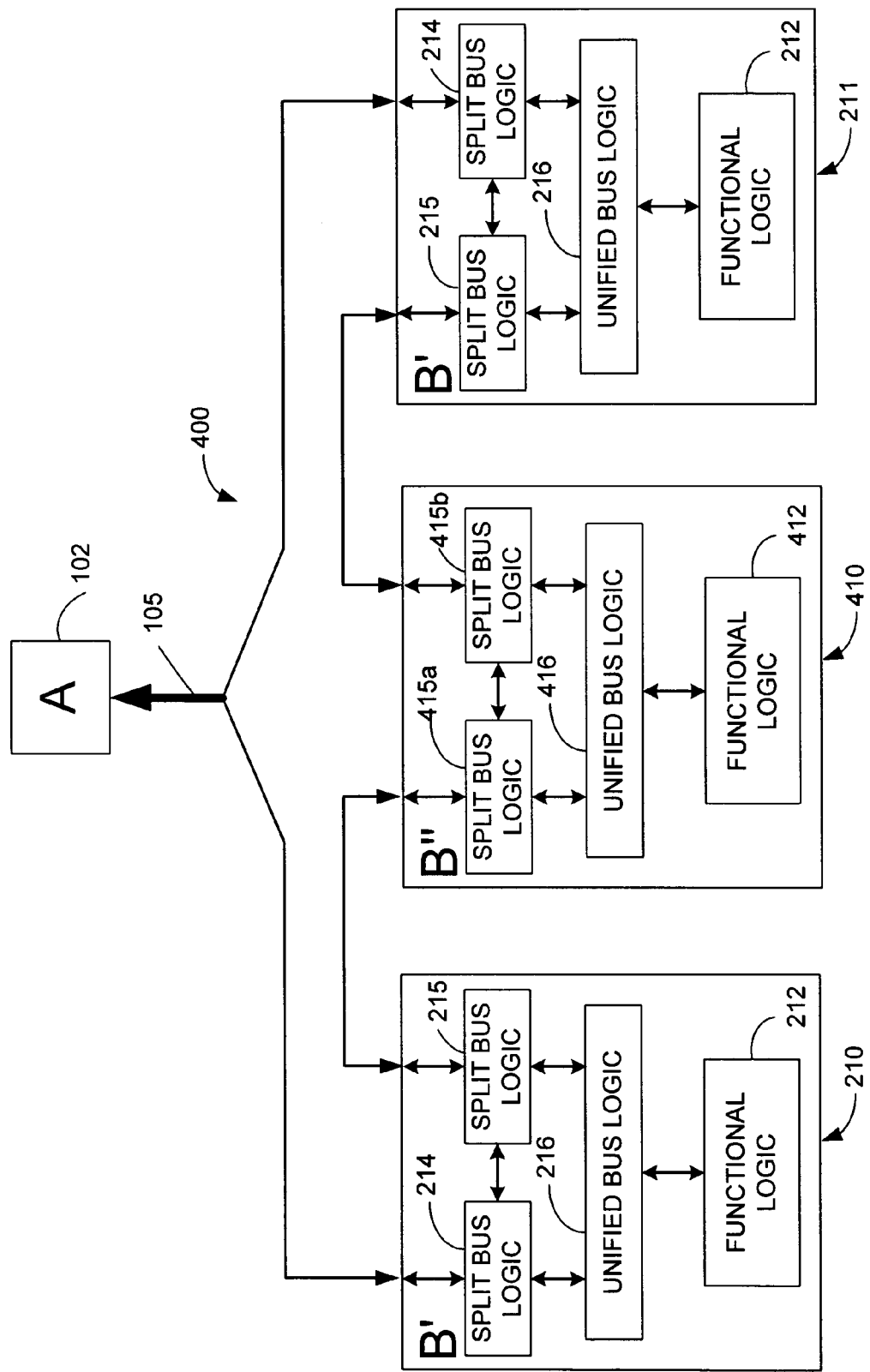
FIG. 6 is a block diagram similar to FIG. 2, illustrating an embodiment of the present invention, in which an additional inventive integrated circuit component is configured to be interposed between two inventive components that are coupled to a system bus.

For example, although not specifically illustrated, the embodiment of FIG. 6 may be used in an implementation such as that illustrated in FIG. 5 (e.g., as a memory controller) to further expand the number of memories that may be accessed by the collective memory controller of chips 210, 211, and 410, without a commensurate increase in pin count for the chips 210, 211, and 410. Certainly, other embodiments and uses will be appreciated by persons skilled in the art.

Figure 7:
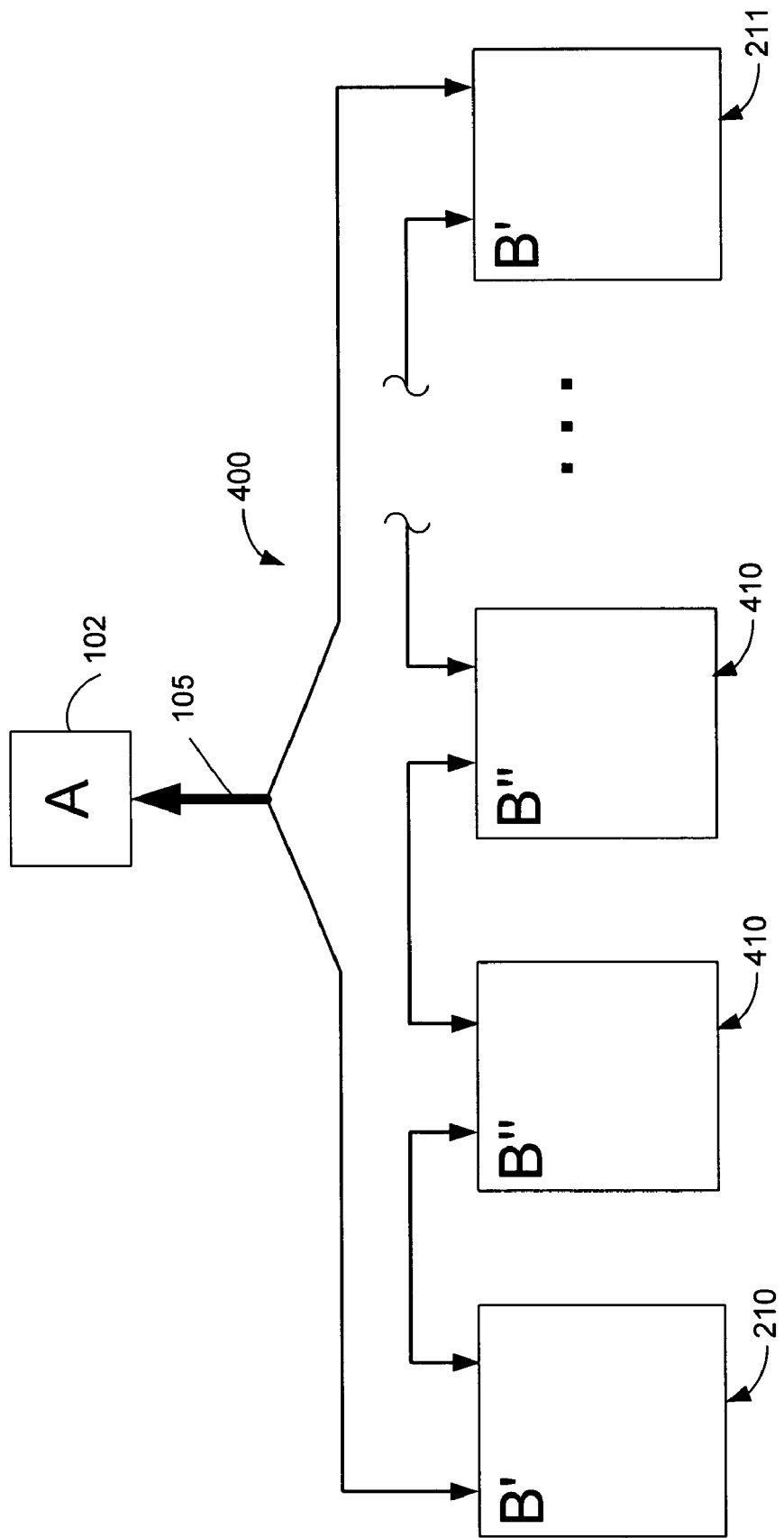
FIG. 7 is a block diagram illustrating the scalability of the invention when configured in the embodiment of FIG. 6.

Although the embodiment of FIG. 6 has been illustrated as comprising three chips 210, 211, and 410, it should be appreciated that the system 400 with the inventive chips is readily scalable to comprise any practical number of chips, based on factors such as the organization, speed, and communication protocol of the system bus 105. The scalability is achieved by inserting additional intermediate chips configured as chip 410. Reference is made to FIG. 7, which explicitly illustrates this scalability.

As illustrated in FIG. 7, additional chips 410 may be interposed between chips 210 and 211. As described previously, chips 210 and 211 are each configured to interface with only a portion of the system bus 105. Chips 410, in contrast, do not interface with the system bus 105, but rather are configured merely to hop or relay information received from one split bus interface 215 through the other split bus interface 215 and out to the next chip in the sequence.

There are a variety of applications where such a configuration may be highly desired. For example, system are known having, for example, a point-to-point serial style connection protocol that are provisioned to connect an arbitrary number of "clients" (e.g., memory controllers, I/O controllers, etc.) to a "host" circuit by daisy chaining the client controllers. In such prior art configurations, each controller chip requires two complete sets of interface pins and sends the data received on one of its interfaces on to the next controller in the chain, which is attached to it's other interface. In contrast, an inventive system configured as illustrated in FIG. 6 or 7, allows the same functionality of an arbitrary number of controllers attached to the host, but eliminates the requirement that each controller have two complete sets of interface pins. This significantly reduces the number of pins required per chip (and therefore manufacturing costs).

Thus, the present invention provides for reduced manufacturing costs and enhanced design flexibility.

Again, since there are a wide variety of particular functional and system variations, implementation-specific details need not be provided herein as such details will often be driven by design objectives and tradeoffs, and are within the level of skill possessed by one of ordinary skill in the art.

What is claimed is:

1. A system in which a plurality of companion integrated circuit components collectively implement a logic function embodied in a single, conventional integrated circuit component, comprising:
a host integrated circuit component communicating with other integrated circuit components via a system bus;
a first integrated circuit component comprising logic for interfacing with a first portion of system bus;
a second integrated circuit component comprising logic for interfacing with a second portion of system bus;
a third integrated circuit component not directly coupled with the system bus and comprising logic for communicating with the host integrated circuit via the first and second integrated circuit components, wherein the first integrated circuit component, the second integrated circuit component, and the third integrated circuit component are provided in separate integrated circuit chips; and
at least one additional integrated circuit component not directly coupled with the system bus, and comprising logic for communicating with the host integrated circuit via the first, second, and third integrated circuit components.

2. The system of claim 1, wherein the third integrated circuit further comprising a functional logic block that performs a conventional functional operation.

* * * * *

UNITED STATES PATENT AND TRADEMARK OFFICE
CERTIFICATE OF CORRECTION

| | |
|---|---|
| PATENT NO. | : 7,343,440 B2 |
| APPLICATION NO. | : 10/630260 |
| DATED | : March 11, 2008 |
| INVENTOR(S) | : Erin Antony Handgen et al. |

It is certified that error appears in the above-identified patent and that said Letters Patent is hereby corrected as shown below:

On the face page, in field (56), under "Other Publications", in column 2, line 2, delete "Definition of "Flash Memory" from Wikipedia, unknown date.*".

Signed and Sealed this

Nineteenth Day of August, 2008

JON W. DUDAS
*Director of the United States Patent and Trademark Office*